United States Patent [19]
Hoffmueller et al.

[11] Patent Number: 6,062,463
[45] Date of Patent: May 16, 2000

[54] MANUFACTURING PROCESS AND ARRANGEMENT FOR MANUFACTURING BRUSH-TYPE SEALS

[75] Inventors: Wilhelm Hoffmueller, Munich; Josef Eichner, Scheyern; Franz Prieschl, Reichertshausen, all of Germany

[73] Assignee: MTU Motoren- und Turbinen-Union Muenchen GmbH, Munich, Germany

[21] Appl. No.: 09/091,009

[22] PCT Filed: Sep. 30, 1997

[86] PCT No.: PCT/EP97/05356

§ 371 Date: Jun. 8, 1998

§ 102(e) Date: Jun. 8, 1998

[87] PCT Pub. No.: WO98/15209

PCT Pub. Date: Apr. 16, 1998

[30] Foreign Application Priority Data

Oct. 8, 1996 [DE] Germany .................. 196 41 374

[51] Int. Cl.[7] .................................................. B23K 31/02
[52] U.S. Cl. .................... 228/212; 228/4.1; 228/44.3; 29/888.3
[58] Field of Search .................... 228/212, 213, 228/4.1, 6.1, 44.3; 277/355; 415/173.3; 29/423, 445, 888.3

[56] References Cited

U.S. PATENT DOCUMENTS 3,917,150  11/1975  Ferguson et al. .................. 228/159
4,274,575   6/1981  Flower ............................... 228/160
4,642,867   2/1987  Hough et al. ........................ 29/423
5,165,758  11/1992  Howe .
5,183,197   2/1993  Howe ................................ 228/160

FOREIGN PATENT DOCUMENTS 2022197  12/1979  United Kingdom .

Primary Examiner—Samuel M. Heinrich
Attorney, Agent, or Firm—Evenson, McKeown, Edwards & Lenahan, PLLC

[57] ABSTRACT

The invention relates to a manufacturing process for brush-type seals having the following steps:

Stacking of bristles in a bristle receiving shaft such that the bristles are partially situated next to the space for at least one brush cheek;

adjusting the bristle receiving shaft in synchronization with the stacking of the bristles relative to a point of introduction of the bristles into the bristle receiving shaft so that the position of a bristle stack surface in the bristle receiving shaft remains at least essentially constant relative to the point of introduction;

fastening the bristles on at least one brush cheek in the bristle receiving shaft; and removing the at least one brush cheek with the bristles fastened thereto from the bristle receiving shaft.

In addition, the invention provides an arrangement for manufacturing brush-type seals by means of which the above-mentioned process can be carried out correspondingly.

33 Claims, 5 Drawing Sheets

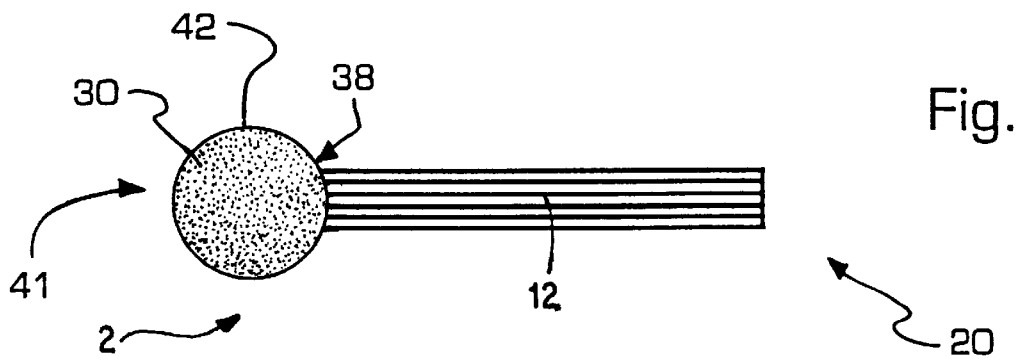
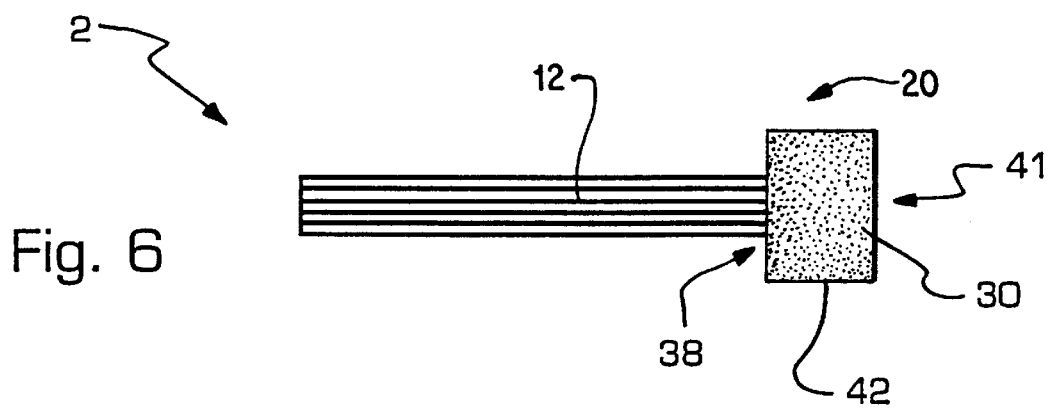
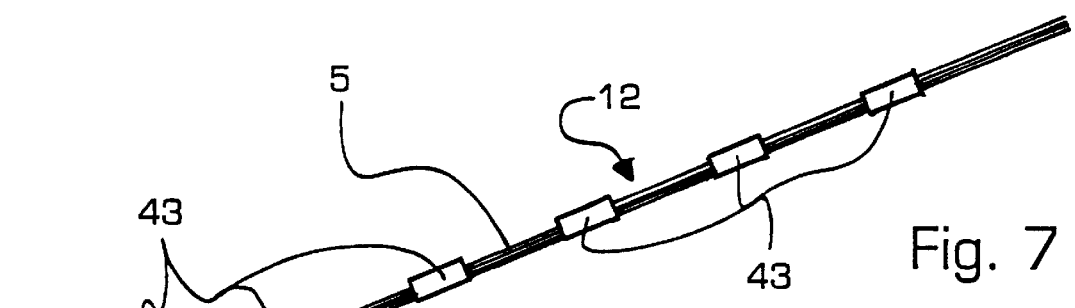
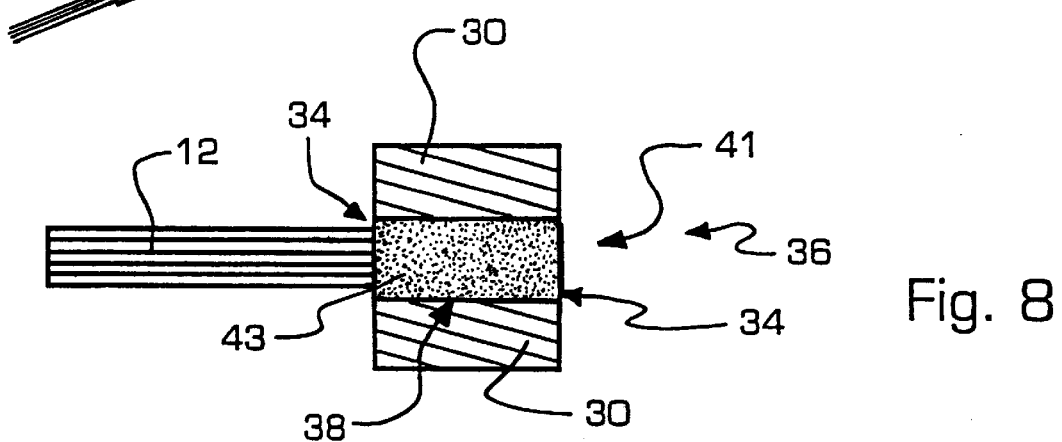

MANUFACTURING PROCESS AND ARRANGEMENT FOR MANUFACTURING BRUSH-TYPE SEALS

The invention relates to a manufacturing process for brush-type seals. Furthermore, the invention relates to an arrangement for manufacturing brush-type seals according to the preamble of claim 18.

The mounting of, for example, ceramic bristles to form a brush-type seal still requires relatively high expenditures, particularly with respect to fastening these bristles on a carrier.

As customary and generally known in the manufacturing of brushes, an arrangement is required for this purpose which contains a holding device for constructing a brush cheek having bristles fastened on the latter for forming a brush-type seal.

It is an object of the present invention to simplify the manufacturing of brush-type seals.

The manufacturing process for brush-type seals according to the invention therefore comprises the following steps:

Stacking of bristles in a bristle receiving shaft such that the bristles are partially situated next to the space for at least one brush cheek;

adjusting the bristle receiving shaft in synchronization with the stacking of the bristles relative to a point of introduction of the bristles into the bristle receiving shaft so that the position of a bristle stack surface in the bristle receiving shaft remains at least essentially constant relative to the point of introduction;

fastening the bristles on at least one brush cheek which was inserted or formed in the bristle receiving shaft before or after the stacking of the bristles in the bristle receiving shaft; and removing the at least one brush cheek with the bristles fastened thereto from the bristle receiving shaft.

As a result of the fact that the bristle receiving shaft is guided past the point of introduction in synchronization with the feeding of the bristles into the bristle receiving shaft, the desired or required defined bristle quantity can be guided and stacked in a simple and efficient manner so that, in the bristle receiving shaft, the individual bristles will immediately take up their end position for the brush in an automatic manner. A manual alignment of the individual bristles is not required. The process according to the invention can not only be carried out rapidly and therefore with a high effectiveness but also in an automated manner, which further increases the effectiveness.

In addition, by means of the process according to the invention, possibilities of errors are avoided during the manufacture of brush-type seals, particularly in the alignment of bristles which leads to lower rejects and thus to a higher productivity and to lower costs.

The invention is not limited to the fact that, in the case of the process, a least one brush cheek is inserted into the bristle receiving shaft before the stacking of the bristles. The at least one brush cheek may, for example, also be inserted into the bristle receiving shaft or formed therein after the stacking of the bristles into the bristle receiving shaft.

Preferably two brush cheeks are inserted into the bristle receiving shaft and the bristles are stacked such in the bristle receiving shaft that the bristles are partially situated between the two bristle cheeks. As a result, the bristles are particularly well mounted after their fastening on the two bristle cheeks.

An additional or alternative possibility, which can be carried out in a simple manner and with a high efficiency and durability, for fastening the bristles on the at least one brush cheek, according to the invention, preferably consists of melting the bristles in their area situated next to the at least one brush cheek by using,, for example, a laser, a plasma torch or a similar device. As a further development, during the melting of the bristle ends, material of the same type can be added with respect to the bristles and/or the at least one bristle cheek.

The fastening of the bristles on the at least one brush cheek can be promoted by another further development of the process according to the invention in that the bristles, before the introduction in the bristle receiving shaft for their stacking therein are subjected to a surface treatment in their area which comes to be situated next to the at least one brush cheek. In particular, such a surface treatment may comprise the application of a fastening agent or auxiliary adapted to the materials of the bristles and the brush cheek for the later fastening of the bristles on the at least one brush cheek by brushing, spraying, galvanizing, sputtering, CVD or PVD and/or a treatment for enlarging the surface of the bristles in this area.

The process according to the invention permits the manufacturing of one-sided or two-sided brush seals with respect to the at least one brush cheek. This may be set up by the position of the at least one brush cheek relative to the bristles so that the bristles can be fastened in one of their end areas or in an intermediate area on the at least one bristle cheek.

For manufacturing brush-type seals, it is also preferred to first manufacture brush-type seal segments which are finally coupled to form a complete brush-type seal. Preferably, this takes place in that, before the bristles are introduced into the bristle receiving shaft, a first segment end part is inserted in the latter. Then, before the fastening of the bristles on the at least one brush cheek, a second segment end part is inserted into the bristle receiving shaft. Before the individual brush seal segments are combined to form a complete brush-type seal, the first and the second segment end parts are finally removed.

Another solution of the object on which the invention is based consists of a manufacturing arrangement for brush-type seals according to claim 7.

The arrangement for manufacturing brush-type seals therefore contains a holding device for constructing a brush cheek with bristles fastened thereon for forming a brush-type seal. According to the invention, it is provided that the holding device is formed by a bristle receiving shaft which has at least one recess for a brush cheek in its shaft course so that bristles stacked in the bristle receiving shaft may be situated partially next to the at least one brush cheek and can be adjusted relative to a point of introduction of the bristles in the bristle receiving shaft so that the position of a bristle stacking surface in the bristle receiving shaft can be maintained to be at least essentially constant in its adjustment relative to the point of introduction.

In the case of a further development, the bristle receiving shaft preferably contains a shaft end wall which determines the point of introduction of the bristles and which, during the adjustment of the bristle receiving shaft, can be held to remain stationary for the determination of the shaft inlet. This also leads to an increased safety and to reduced expenditures in the case of the arrangement according to the invention.

For facilitating the operation of the arrangement for manufacturing brush-type seals, it can be provided as an alternative or in addition according to the invention that the bristle receiving shaft contains a removable shaft end wall so that a connection area of the bristles with the brush cheek in the bristle receiving shaft can be opened up. As a result, the fastening of he bristles on the at least one brush cheek can be carried out in a particularly simple, fast and reliable manner.

Within the scope of another further development of the invention, a deflecting roller, which determines the point of introduction of the bristles in the bristle receiving shaft is held to remain stationary with respect to the bristle receiving shaft for determining a shaft inlet. Furthermore, a band is provided here which can be fed by way of the deflecting roller synchronously with the adjustment of the bristle receiving shaft and which, in the area of a shaft bottom of the bristle receiving shaft, can be mounted on the latter, in which case, in the area of the bristle receiving shaft, the band is at least a component of a shaft end wall. This shaft end wall can therefore be formed, for example, by a steel band which, coming from a feeding roller, is connected by way of the deflecting roller to the shaft bottom of the bristle receiving shaft. Synchronously with the adjustment of the bristle receiving shaft, the band is wound off the feeding roller and, after the deflection by way of the deflecting roller, covers the bristle receiving shaft. As a result, when the bristle receiving shaft is adjusted, no relative movement occurs between the bristles stacked therein and the shaft end wall, and the position of the bristles is maintained in a stable manner. The band can, for example, be held tight with respect to the adjusting movement of the bristle receiving shaft by means of a torsion spring interacting with the feeding roller.

Although the invention is not limited to the manufacturing of ring-shaped brush-type seals, the inventors consider this the predominant application. For this purpose, it is advantageous and therefore preferred that the bristle receiving shaft contains a ring groove or a ring groove section which can be adjusted about the ring center, and contains a shaft end wall which covers the ring groove or the ring groove section and which, in particular, is removable and is stationary during the adjustment of the bristle receiving shaft with respect to the point of introduction of the bristles in the bristle receiving shaft.

In a further development of this embodiment, it can also preferably be provided that the depth of the ring groove or of the ring groove section extends in the radial direction. The brush-type seals which can be manufactured by means of this arrangement have bristles which are situated in the radial direction or at an angle thereto in the radial plane. However, within the scope of the invention, it is also possible that brush-type seals are produced whose bristles are situated in the axial direction with respect to the ring shape of the seal.

By means of a further development of the invention, particularly stable and durable brush-type seals can be manufactured. For this purpose, it is provided that the bristle receiving shaft has a T-shaped cross-section; that each of the two transverse branches of the T-shape forms a recess for a brush cheek; and that the bristles can be stacked in the bristle receiving shaft with one of their end areas between the two inserted bristle cheeks, in which case the upper section of the T-shape is formed by a shaft end wall which, in particular, can be removed and is stationary when the bristle receiving shaft is adjusted with respect to a point of introduction of the bristles into the bristle receiving shaft.

If the at least one recess for a brush cheek in the bristle receiving shaft is of such a shape and size that, when a brush cheek is inserted therein and bristles are stacked in the bristle receiving shaft, in a connection area of the latter with the brush cheek, a receiving space is formed for fastening devices for fastening the bristles on the brush cheek, a larger quantity of fastening agent can be used for achieving a particularly firm and durable connection of the bristles with the brush cheeks or cheeks.

The automation and thus the operating speed and reliability of the arrangement according to the invention for manufacturing brush-type seals can be further increased by bristle feeding devices for introducing bristles into the bristle receiving shaft. Another further development of this embodiment provides that the bristle feeding devices are designed for introducing various types of bristles into the bristle receiving shaft, particularly for definable arrangements of the various bristle types in the bristle receiving shaft, and that the bristle feeding devices preferably have an adjustable control for the arrangement of the various bristle types in the bristle receiving shaft. Thus, as a function of the area of usage of the brush-type seals to be manufactured, optimal materials and shapes of the bristles can be combined in a seal in a simple and efficient manner.

By using at least a first segment end part, as another advantage, a bottom of the bristle receiving shaft can be formed by a layer surface of the first segment end part which determines the position and alignment of the stacked bristles relative to the at least one brush cheek. This ensures in a simple manner an inclination of the bristles with respect to the at least one brush cheek which takes into account a later use of the brush-type seal on a rotating shaft.

A most extensive automating of the arrangement according to the invention for manufacturing brush-type seals can advantageously be achieved in that a control is provided which is designed for synchronizing the adjustment of the bristle receiving shaft with its degree of bristle filling. Preferably, this control influences also optionally provided bristle feeding devices or, by means of the latter, detects the filling degree of the bristle receiving shaft. The automating can be optimized in that the control synchronizes the bristle feeding devices and the adjustment of the bristle receiving shaft.

Additional advantageous and preferred embodiments of the invention are found in the dependent claims and their combinations.

In the following, the invention will be described for the purpose of a clarification by means of embodiments with reference to the drawing.

FIG. 5 is a schematic cross-sectional view of a third type of construction of a brush-type seal;

FIG. 6 is a schematic cross-sectional view of a fourth type of construction of a brush-type seal;

FIG. 7 is a schematic representation of bristle material subjected to a surface treatment;

FIG. 8 is a schematic cross-sectional representation of a fifth type of construction of a brush-type seal with bristles which were manufactured by using the bristle material of FIG. 7.

Figure 1:
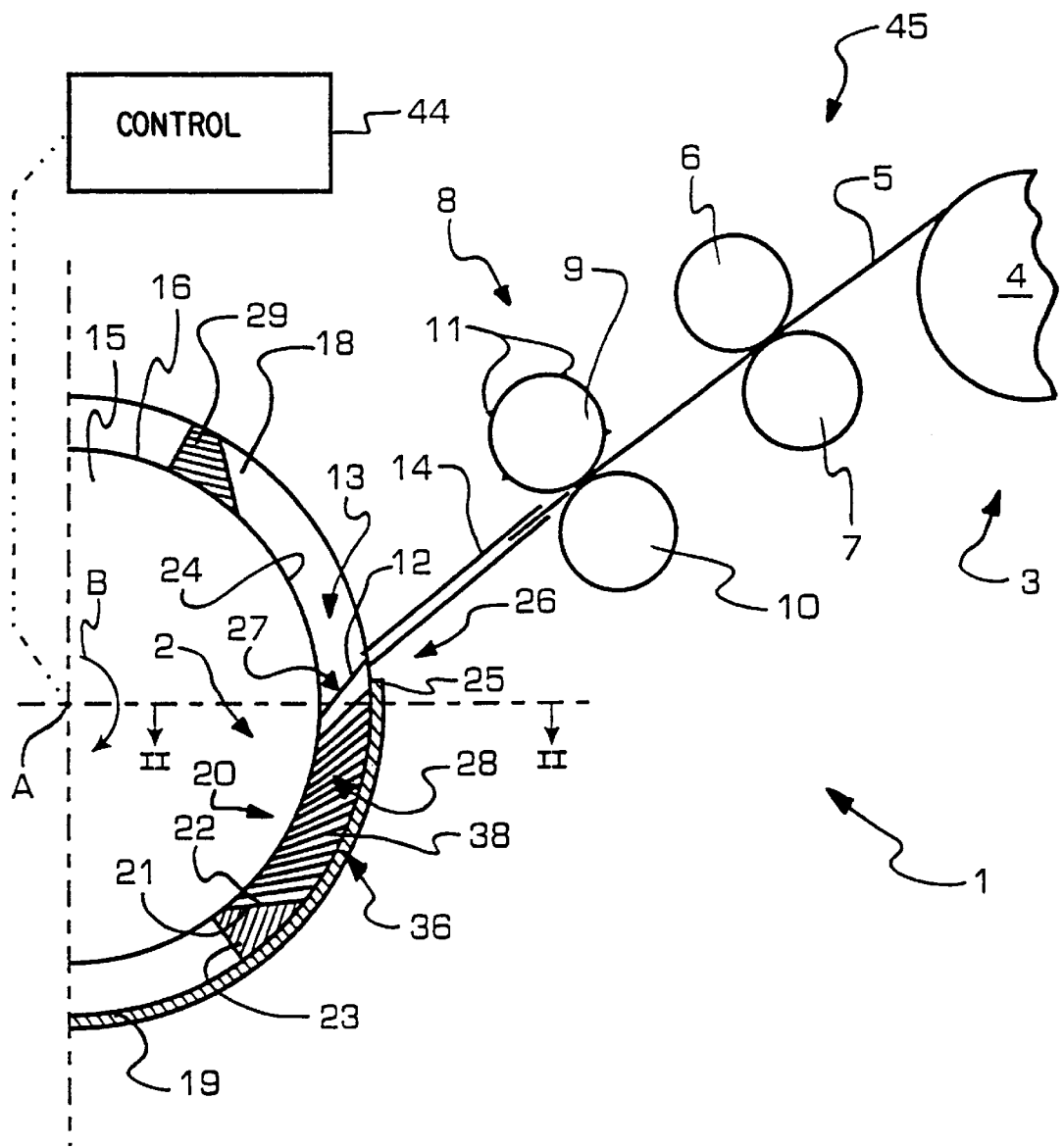
FIG. 1 is a schematic, partially sectional lateral view of a first embodiment of the arrangement for manufacturing brush-type seals.

An arrangement 1 for manufacturing brush-type seals 2 illustrated in FIG. 1 contains a material dispensing device 3 in the form of a drum 4, such as a fiber drum, having bristle material 5 wound onto it, which may, for example, be a fiber or a fiber material. The latter is withdrawn from the drum by guide rollers 6, 7 and is supplied to a cutting device 8 which contains a cutting roller 9 and a counter roller 10. The cutting roller 9 has cutting teeth 11 on its circumference whose spacing on the cutting roller circumference or cutting wheel circumference corresponds to the length of the bristles 12 which can be cut by it from the bristle material 4. The counter roller 10 may have indentations (not shown) or other devices or designs which, with respect to their position, are assigned to the cutting teeth 11 of the cutting roller 9 and which ensure a reliable and clean cutting-off of the bristles 12 from the bristle material 5.

In the illustrated embodiment, the guiding rollers 6, 7 as well as the cutting roller 9 and the counter roller 10 are driven so that they convey the bristle material or the bristles 12 cut from it in the direction of a bristle receiving shaft 13. For bridging the path from the cutting device 8 to the bristle receiving shaft 13, a bristle guide 14 is provided which may be of a tube or a shell type and guides the bristles 12 securely from the cutting device 8 to the bristle receiving shaft 13. In order to be able to direct different bristles 12 to the bristle receiving shaft 13, which may take up or have various positions and arrangements, the bristle guide 14 may offer corresponding adjusting possibilities and/or exist several times in order to guide, from a plurality of material dispensers 3, bristle material 3 simultaneously or alternately to the bristle receiving shaft 13.

Figure 2:
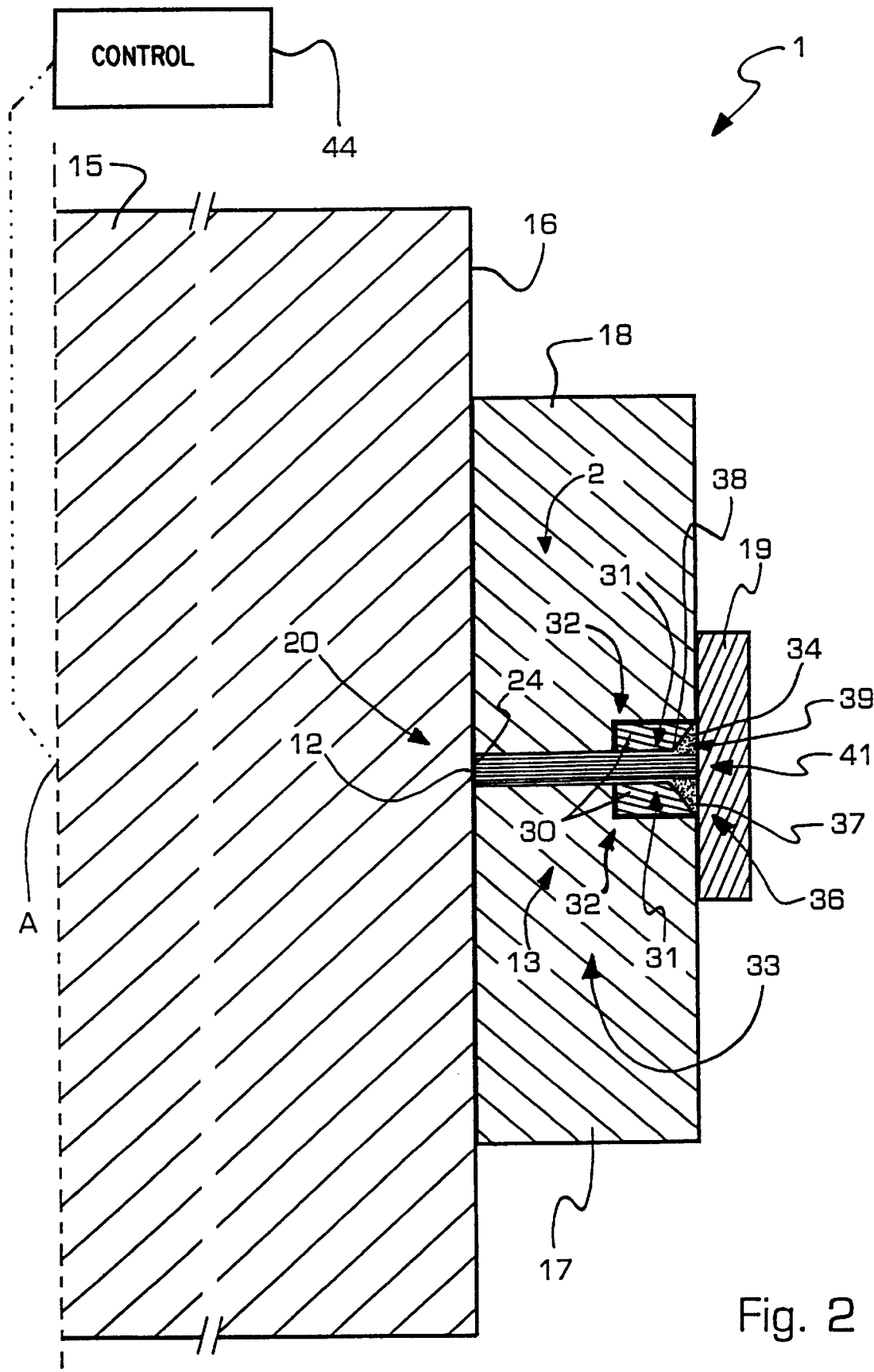
FIG. 2 is a schematic sectional view along Line II—II in FIG. 1.

The bristle receiving shaft 13, which is shown in a cross-sectional view also in FIG. 2, contains a carrier disk 15; two lateral rings 17, 18 as shaft side walls which a mounted in a spaced manner on its circumferential surface 16; and a shaft end wall 19 which is positioned relative to the lateral rings 17, 18 but is not connected with them. In the direction of the shaft course, the shaft end wall 19 has a length which is coordinated with the length of a brush-type seal segment 20 and which be produced by using the bristle receiving shaft 13 and can be used for building a complete brush-type seal 2. The carrier disk 15 and the two lateral rings 17, 18 mounted on its circumferential surface 16 in a spaced manner form a ring groove or a ring groove section which, for forming the bristle receiving shaft 13 can be covered by the shaft end wall 19 by adjusting the bristle receiving shaft 13.

The length of the shaft end wall 19 in the direction of the shaft course can be suitable for a plurality of brush-type seal segments 20 of different lengths since the shaft bottom 21 of the bristle receiving shaft 13 is formed by a layer surface 22 of a first segment end 23 whose position and dimension in the direction of the shaft course determines the length inside the bristle receiving shaft 13 available for the brush-type seal segment formation within the scope of the length of the shaft end wall 19.

It should be taken into account that the carrier disk 15 must form only the interior shaft wall 24 and can have any other dimensions. Instead of the carrier disk 15, a partial disk, a ring or a partial ring may also be used as long as it provides a sufficient circumferential surface according to the planned length of the brush-type seal segments 20. Correspondingly, the lateral rings 17, 18 may also be formed by partial rings.

The carrier disk 15, together with the lateral rings 17, 18 fastened on it, can be rotated about their center A. Since the lateral end wall 19 is not connected with the lateral rings 17, 18, it remains stationary during a rotation or general adjustment of the carrier disk 15 and forms a stationary boundary of a point of introduction 26 for bristles 12 into the bristle receiving shaft 13 at its end 25 situated in the opposite direction of the rotating direction (adjusting direction) B of the carrier disk 15 in the sense of a lengthening of the effective length of the bristle receiving shaft 13 for receiving bristles 12. During a rotation of the carrier disk 15 for extending the effective length of the bristle receiving shaft 13 for receiving bristles 12, the first segment end 23 is moved along the shaft end wall 19 away from the point of introduction 26 for the bristles 12.

The constructions of the arrangement 1 are not limited to those which comprise a rotational adjustment of the carrier disk 15. The form of the adjusting path as well as the form of the shaft course may also be adapted to the shape of the brush-type seals 2 which are to be produced by means of the arrangement 1.

The bristles 12 are therefore guided from the cutting device 8 by way of the bristle guide 14 to the point of introduction 26 from where they are stacked in the bristle receiving shaft 13. As the filling of the bristle receiving shaft 13 increases, it is adjusted such by the rotation of the carrier disk 15 that the surface 27 of the bristle stack 28 formed int he bristle receiving shaft 13 maintains its position relative to the point of introduction 26 at least in an essentially constant manner. When a planned segment size has been reached; that is, a sufficient quantity of bristles 12 has been stacked into the bristle receiving shaft 13, form the direction of the point of introduction 26, a second segment end 29 is inserted into the bristle receiving shaft 13 for, for example, fixing the bristle stack 28.

Before the brush-type seal segment 20 can now be completed, a brush cheek 30 is required to which the bristles 12 can be fastened. In the embodiment illustrated in the drawing and described here, according to the process, two brush cheeks 30 are inserted into the bristle receiving shaft 13. As best illustrated in the cross-sectional view of FIG. 2, for this purpose, the bristle receiving shaft 13 has a T-shaped cross-section. Each of the two brush cheeks 30 is inserted into a transverse branch 32 of the T-shape 33 which each forms a recess 31 so that it extends along the course of the shaft. The lateral end wall 19 forms the upper end of this T-shape 33. The sides of the transverse branch 32 of the T-shape 33 and the sides of the stem of the T-shape 33 as well as the undersides of the transverse branches 32 are formed by the lateral rings 17, 18, and the foot of the T-shape 33 is formed by the carrier disk 16. The lateral rings 17, 18 can be braced relative to one another in order to be able to securely hold the bristles 12 arranged in-between.

However, within the scope of the invention, it is not important in regard to the process and arrangement whether the brush cheeks 30 are inserted before the stacking of the bristles 12 in the bristle receiving shaft 13 or afterwards, or whether the brush cheeks 30 are formed directly by the injecting of a suitable material before or after the stacking of the bristles 12 in the bristle receiving shaft 13 in a corresponding mold cavity of the bristle receiving shaft 13 which would then correspond to the recesses 31. Basically, the invention is also not limited to the use of two brush cheeks 30. For example, the cross-section of the bristle receiving shaft 13 may also have an L-shape (not shown) in whose transverse web a bush cheek 30 is used. However, any other cross-sectional shape of the bristle receiving shaft 13 is conceivable which is adapted to the later application site of the brush-type seals 2.

In the present embodiment, the two brush cheeks 30 can be inserted, for example, from the direction of the point of introduction 26, while the lateral end wall 19 rests against the lateral rings 17, 18, into the recesses 31 of the bristle receiving shaft 13. However, before the inserting of the brush cheeks 30 into the recesses 31, the lateral end wall 19 can also be removed so that the recesses 31 are freely accessible nd the brush cheeks 30 can therefore be inserted in them.

When the brush cheeks 30 are situated in the recesses 31 of the bristle receiving shaft 13 and the bristle stack 28 is situated in the bristle receiving shaft 13 to the intended extent, the length of the brush cheeks 30 in the direction of the course of the shaft corresponding to the height of the bristle stack 28, and the second segment end 29 was optionally mounted, the bristles 12 may be fastened on the brush cheeks 30 or may connected thereto. In the event that the brush cheeks 30 were formed directly in the recesses 31 of the bristle receiving shaft 13 after the bristle stack 28 was completed, the connection of bristles 12 with the brush cheeks 30 can take place, for example, in that the bristles 12 are partially poured into the brush cheeks 30.

If, however, prefabricated brush cheeks 30 are used and are inserted into the bristle receiving shaft 13, for example, before the stacking-in of the bristles 12, they must be connected with the individual bristles 12 after the completion of the desired bristle stack 28. Several possibilities exist for this purpose of which several will be indicated as examples with reference to the embodiments illustrated in FIGS. 3, 4, 5, 6 and 8.

In order to connect the bristles 12 with the brush cheeks 30, a fastening agent 3 may be used. This fastening agent may, for example, be a bending agent 35 which is applied in a connection area 36 of the bristles 12 with the brush cheeks 30 and, after the hardening, ensures a firm connection between the bristles 12 and the brush cheeks 30. The bonding agent 5 is adapted to the materials, such as ceramics or metal, used in the case of the bristles 12 and the brush cheeks 30 so that a special bonding agent for ceramic/metal connections is used. For receiving a bonding surface which is as large as possible, in the embodiment of the brush cheeks 30 illustrated in FIG. 3, it is provided that the latter form a connecting or receiving space 37 which has a rectangular cross-section and is part of the recesses 31. Instead of one continuous connecting space 37, several separate connecting spaces may also be provided.

Figure 3:
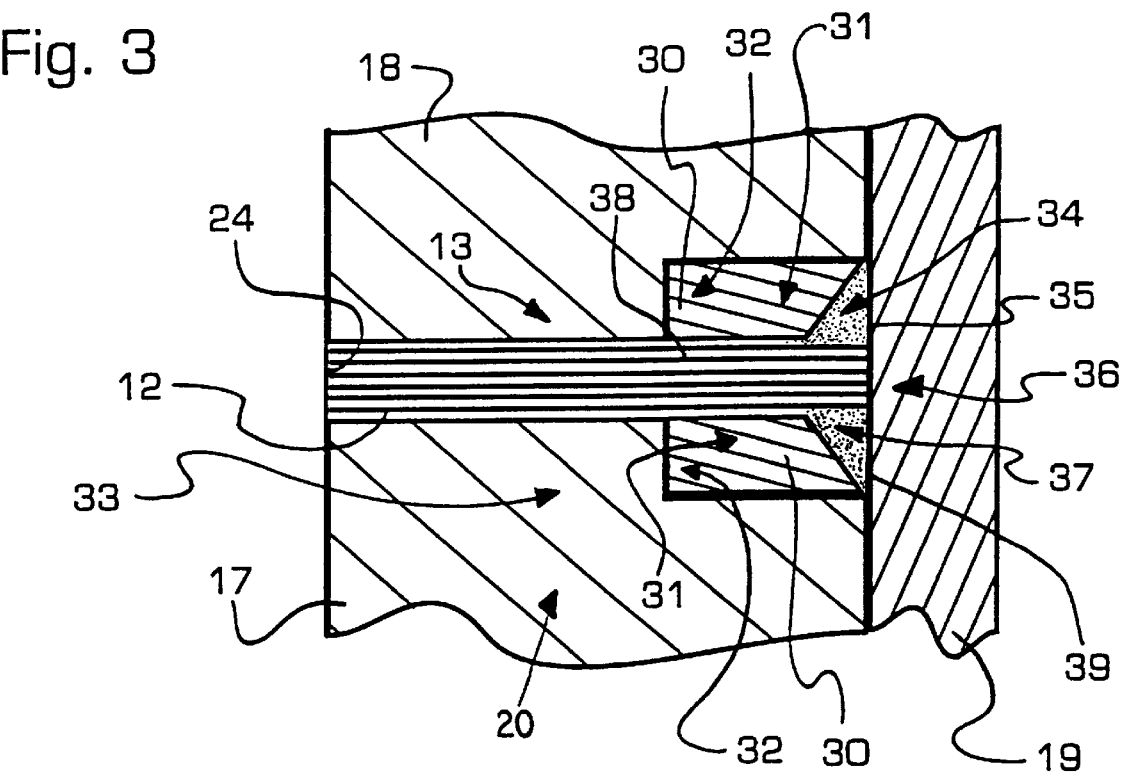
FIG. 3 is a schematic cross-sectional view of a first construction of a brush-type seal and a portion of the construction of the arrangement for manufacturing brush-type seals of FIG. 1.

This whole connecting space 37 can be filled with the bonding agent 35 so that, corresponding to the representation in FIG. 3, the end ares of the bristles 12 reaching into this connecting space 37 are completely surrounding by the bonding agent 35 which otherwise is applied to the interior side of the connecting space 37. The thus established connection is extremely firm and durable. This is intensified by the fact that, after its hardening, the bonding agent 35 forms a web 39 which, viewed from the free unbonded ends of the bristles 12, reaches behind the brush cheeks 30 and thus forms with the latter a form-locking connection against a force onto the bristles 12 int he direction of the brush cheeks 30 ward the free unbonded ends of the bristles 12.

In this embodiment, the connecting space 37 also determines the connection area 36 which is freely accessible because of the removal of the shaft end wall 19. After the removal of the shaft end wall 19, the bonding agent 35 can therefore be applied without any problem to the connection area 36 or may optionally be filled into the connecting space 37. The connecting space 37 or generally the connection area 36 is optionally covered during and/or after the filling-in of the bonding agent 35.

It should be taken into account that in the above-described embodiment, the bristles 12 are connected with the brush cheeks 30 in an end area 38. However, irrespective of the type of fastening of the bristles 12 on the brush cheeks 30, the invention is not limited to this embodiment. For example, the bristles 12 may adjoin the brush cheeks 30 with a center area (not shown) and may project over the brush cheeks 30 in the radial direction (with respect to the lateral rings 17, 18). As the result, a brush-type seal (not shown) can be created which has an inner and an outer brush. In the latter embodiment, it is, for example, conceivable to apply, simultaneously with the stacking-in of the bristles 12 into the bristle receiving shaft 13, bonding agent in the connection area of the bristles 1 with the brush cheeks 30 for their connection.

In addition, in the brush-type seal 2 to be manufactured, the bristles 12 must generally not absolutely always extend radially. The shape and the position of the layer surface 22 of the first segment end 23 can, for example, also be achieved in a bristle alignment which, although it is situated in a radial plane of the lateral rings 17, 18, it extends at an angle to their radii, as illustrated as an example in FIG. 1. However, the bristles 12 may also extend in an axial direction defined with respect to the lateral rings 17, 18 or at an angle thereto. Finally, it is also not required for the brush-type seal to be ring-shaped. It may have any linear or curved shape.

Figure 4:
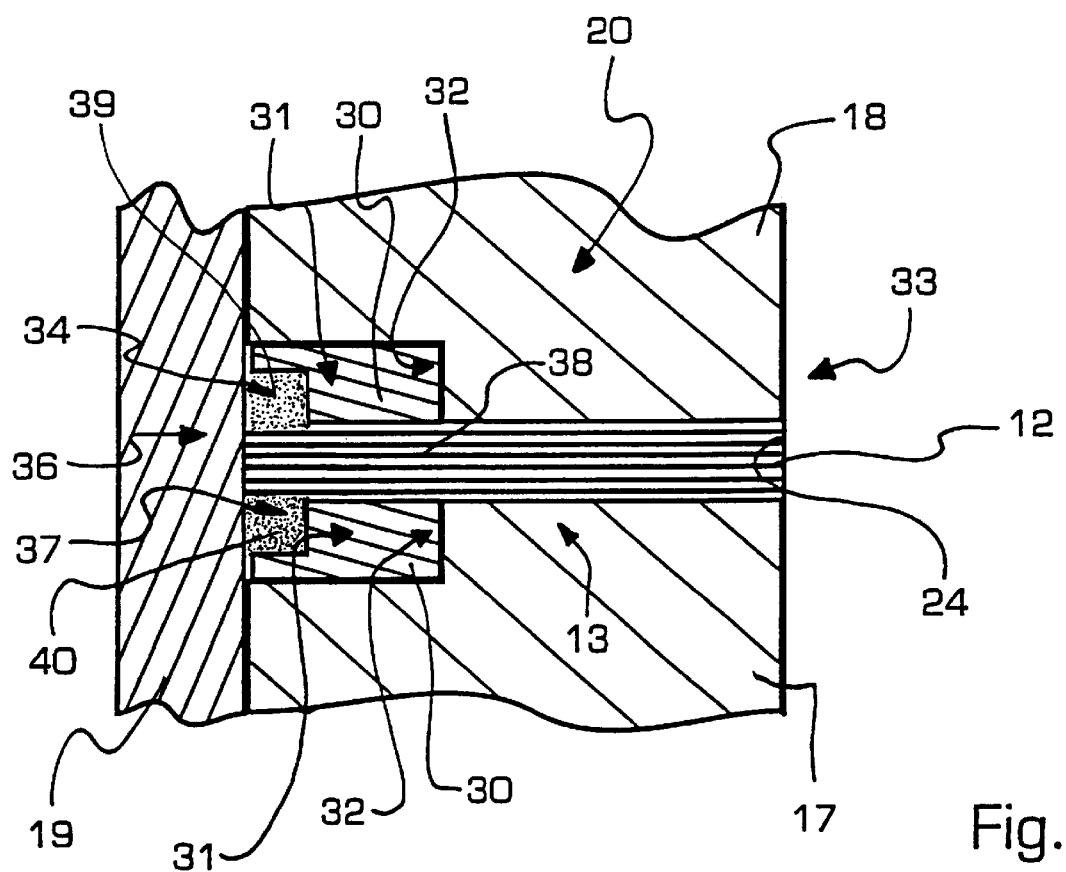
FIG. 4 is a schematic cross-sectional view of a second type of construction of a brush-type seal and a portion of the construction of the arrangement for manufacturing brush-type seals of FIG. 1 in a representation which is analogous to that of FIG. 2.

With reference to FIG. 4, another embodiment will now be described of the brush-type seal 2 which can be manufactured by means of the arrangement and the process according to the invention. The arrangement of the bristles 12 and of the brush cheeks 30 is analogous to that illustrated in FIG. 3. However, the connecting space 37 has a triangular or V-shaped cross-section which expands toward the side of the brush cheeks 30 facing away from the free ends of the bristles 12. In the present embodiment, a solder 40 is used as a fastening agent 34 instead of a bonding agent 35. As a function of the materials of the bristles 12 and of the brush cheeks 30, the solder 40 may, for example, be a palladium solder and may be entered into the connecting space or generally applied to the connection area 36 in a pasty, chopped, powdery or foil form.

The solder 40 can be applied to the connection area 36 by being brushed onto it or may be entered into the pertaining connecting space 37. However, for this purpose, it is required that the shaft end wall 19 is removed so that the brush back 41 is freely accessible. With the same effect, the solder 40 can also be applied to the connection area 36 or entered into the pertaining connecting space 37, for example, as a type of solder paste by means of a spray gun, such as a compressed-air spray gun, comparable to those for the application of paint. The person skilled in the art will be familiar with additional possibilities and devices for their implementation so that these do not have to be described in detail.

So that the solder 40 can carry out its holding effect, it must be melted which can take place by means of a spot-type radiant heater or a linear-type radiant heater, a high-frequency system, a laser, or the like, (not shown) for a short time. Preferably, the melting of the solder 40 takes place in a controlled atmosphere. After the heating of the solder 40 beyond its melting point and its resulting liquefaction, it will fill out the connecting space 37 and possibly penetrate also between the bristles 12 in their corresponding end area 38.

When the solder 40 now cools down again, it will firmly and durably connected the bristles 12 with one another and with the brush cheeks 30 and, in the same manner as the bonding agent 35 of the example of FIG. 3, form a web 39 which reaches behind the brush cheeks 30 in the region of the end areas 38 of the bristles 12.

Particularly when at least one connecting space 37 is provided, it is also possible to fill in the solder 40 in the course of the process during the stacking of the bristles 12 into the bristle receiving shaft 13, similar to the manner described above in conjunction with the use of the bonding agent 35 particularly in the case of two-sided brush-type seals 2 with inner and outer brushes. By way of nozzles (not shown) or general delivery devices, which may be mounted, for example, in the area of the point of introduction 26 for bristles 12 into the bristle receiving shaft 13 on the shaft end wall 29, solder can be filled into the connecting space or optionally the connecting spaces 37 simultaneously with the feeding and stacking of bristles 12 into the bristle receiving shaft 13. If the bristle receiving shaft 13 consists of a material which does not bond with the solder material, for the melting of the solder 40, the bristle receiving shaft 13 can be heated as a whole or at suitable points and virtually forms a mold for the solder 40 so that, when it cools down, it automatically receives a definable shape and surface.

In all embodiments in which solder 40 is used, it may also be possible to fill the latter into the connecting space 37 already in the melted condition. As an alternative to the above-described types of application of the solder 40, it can also be applied to the connection area 36 or entered into the connecting space 37 by means of a flame spraying process or as a plasma which contains metal components and/or ceramic components; by plasma spraying process, or similar process. This process also can be carried out in the case of freely accessible brush backs 41; that is, when the shaft end wall 19 has been removed, as well as in a process-accompanying manner already when the bristles 12 are placed in the bristle receiving shaft 13. Corresponding nozzles (not shown) can be set up at the point of introduction 26, for example, on the shaft end wall 19.

Generally, the bonding agent 35 or the solder 40, depending on the respective type, can be applied to the connection area 36 or entered into the pertaining connecting space 37 by brushing, spraying, galvanizing, sputtering, CVD, PVD or filling-in. As a function of the process, a removal of the shaft end wall 19 before the treatment of the connection area with bonding agent 35 or solder 40 is required or optional so that the brush back 41 will be freely accessible.

The connecting of the bristles 12 with the brush cheeks 30 by means of a galvanic layer on the brush back 41 is suitable particularly when the brush-type seal 2 equipped with it is intended for a use in a low temperature range.

If it is provided at all, the connecting space 37 may also have a cross-section which is not rectangular or triangular. For example, the connecting space may have a cross-section which forms a circle together with the brush cheeks 30. FIG. 5 is a cross-sectional view of a brush-type seal 2 manufactured with corresponding brush cheeks 30 and a matching connecting space 37, or a segment thereof. In this embodiment, the connection of the bristles 12 with the brush cheeks 30 was established by means of heating or warming by means of a laser, a plasma burner, or the like, with the addition of material of the same type. The bristles 12 of this embodiment are, for example, quartz fibers. However, without limiting the present embodiment, generally aluminum oxide fibers, etc. may also be used. By the addition of material of the same type, the size and the shape of the bead can be varied. By the melting-together of the bristles 12 and the brush cheeks 30, these are integrally connected.

As an example, the connecting space 37 can, for example, also be constructed in connection with a circular cross-section of the brush cheeks 30 of the joining with the bristles 12 also by a corresponding shaping of the shaft end wall 19. For this purpose, a corresponding groove or recess (not shown) will then be provided on the shaft-interior-side section of the shaft end wall 19. This embodiment of the arrangement 1 or manufacturing brush-type seals 2 is not limited to the manufacturing of circular brush cheeks 30 but can basically be used in the case of any geometry of the brush cheeks or can be combined with other developments.

Another shape of the bead 42 is illustrated in FIG. 6, in which, after the connection with the bristles 12, the brush cheeks 30 have a rectangular cross-section.

Optionally, the used bristle material 5 can also be coated in sections, for example, before the cutting by means of the cutting device 8 in order to form coating sections 43 on the bristles 12 which, during the connection with the brush cheeks 30 contribute to the fact that the bristles 12 can be more easily and/or better fastened among one another and on the brush cheeks 30. As coatings in the coating sections 43, solder or generally metal can be used which can be applied to the bristles 12 in areas by means of brushing, spraying, sputtering, galvanizing, CVD, PVD, and similar methods.

After this bristle material 5 has been cut into bristles 12 by the cutting device 8 and the bristles 12 have been sorted or stacked into the bristle receiving shaft 13, the coating sections 43 come to be situated next to or between the brush cheeks 30 and can be connected therewith, for example, in the event of a soldering coating, by means of a heat treatment.

FIG. 7 shows an example of a corresponding portion of bristle material 5 to which coating sections 43 are applied in the end areas 38 of the bristles 12 which will later be situated between the brush cheeks 30. One bristle 12 cut off this bristle material 5 is illustrated in FIG. 8 fastened between two brush cheeks 30. If, for example, solder 40 is applied to the bristle material 5 in the coating sections 43, during the melting of this solder 40 as well as of solder 40 situated on the connection area 36, it is optimally ensured that, along a sufficient length of the bristles 12 next to the brush cheeks 30, sufficient solder 40 is available for a fixed and durable connection of the bristles 12 among one another as well as with the brush cheeks 30.

Instead of the solder 40, in the coating sections 43, any other materials can also be applied to the end areas 38 of the bristles 12 which are suitable for the fastening of the bristles 12 with respect to one another and to the brush cheeks 30 or which promote or facilitate such fastenings. Also, any other surface treatment, in addition to a coating, can be carried out in addition or as an alternative. The roughening of a surface area of the bristles 12 is indicated here only as an example. which surface area is later coated and/or is situated between the brush cheeks 30, optionally particularly in a connecting space 37.

The system or arrangement 1 for manufacturing brush-type seals 2 also contains a control 44 (FIG. 1) which takes care of the adjustment of the carrier disk 16 or generally of the bristle receiving shaft 13 as a function of how far the latter is filled with bristles 12. In order to be able to determined the filling condition of the bristle receiving shaft 13 with bristles 12, the control 44 is connected with detection devices (not shown) which may have any conventional design. Suitable detection devices are, for example, light barriers which may be mounted at the point of introduction 26 of the bristles into the bristle receiving shaft 13, for example, on the shaft end wall 19.

However, the control 44 may also be coupled with the bristle feeing devices 45 which are formed by the material dispenser 3 with the drum 4 having wound-up bristle material 5, the guide rollers 6, 7, the cutting device 8 with the cutting roller 9 and the counter roller 10, and the bristle guide 14. The control 44 can then already receive information concerning the fed quantity of bristles 12 from the bristle feeding devices 45; can determine therefrom the filling quantity in the bristle receiving shaft 13; and, as a function thereof, can control the adjustment of the bristle receiving shaft 13. As a result, the manufacturing process of the brush-type seals 2 or of the brush-type seal segments 20 is largely automated and can take place in an efficient manner.

Because of the coupling of the control 44 with the bristle feeding devices 45, the former can also control the feeding of the bristles 12 to the bristle receiving shaft 13 with respect to the quantity and type. In particular, it is therefore possible to combine different types of bristles in a definable manner in one brush-type seal 2 which, however, can also be carried out by a defined type of feeding.

Figure 9:
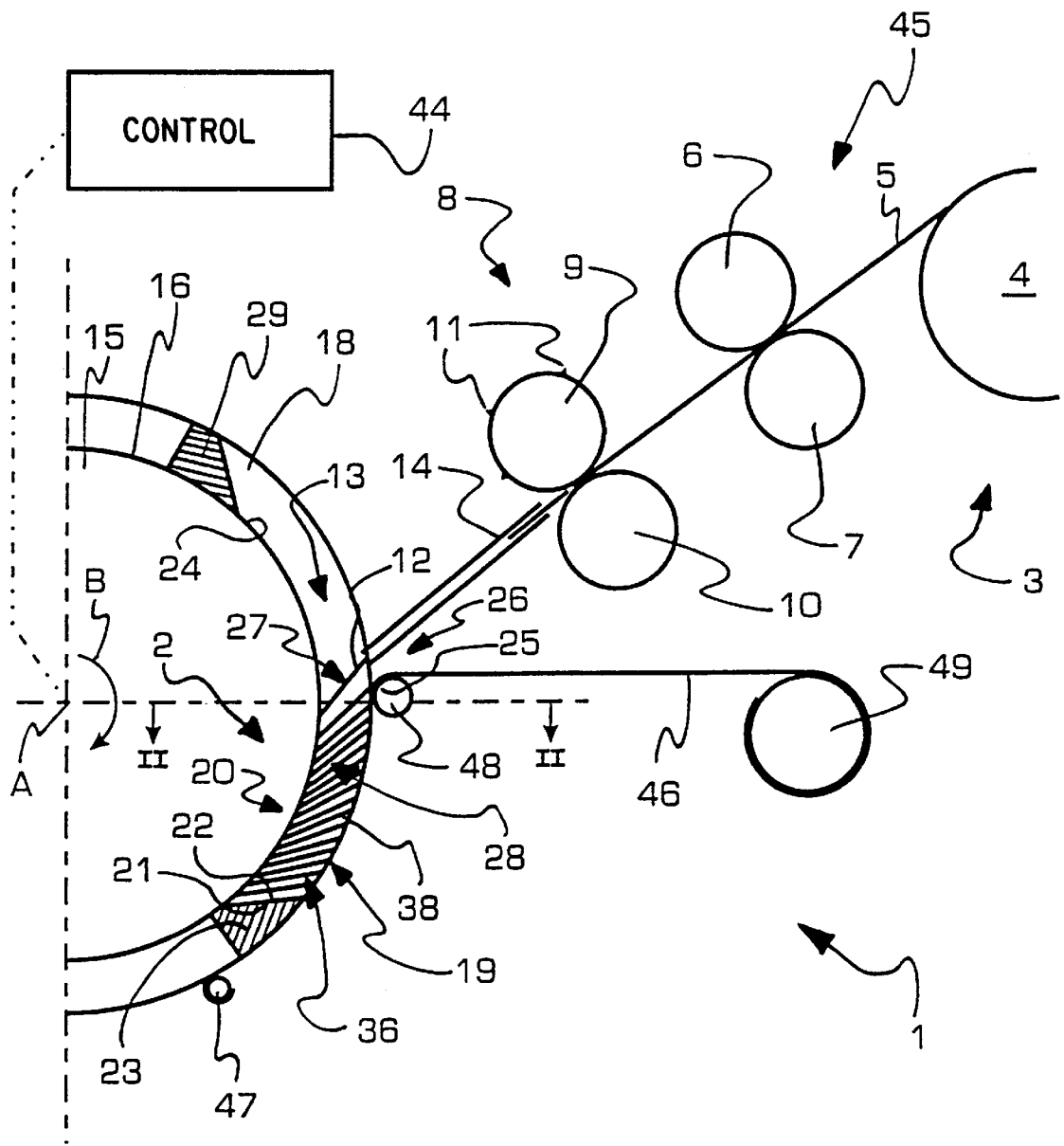
FIG. 9 is a schematic, partially sectional lateral view of a second embodiment of the arrangement for manufacturing brush-type seals.

FIG. 9 shows another embodiment of the arrangement for manufacturing brush-type seals. As demonstrated by a comparison, this embodiment is largely identical with the version illustrated in FIG. 1. However, the design of the shaft end wall 19 is different. Specifically, in the embodiment of FIG. 9, the shaft end wall 19 is not fixedly connected with the drum 4 and the lateral rings 17, 18, as in the design of FIG. 1, but consists of a band 46 which is connected in the area of the shaft bottom 21 by way of a fastening 47 to the bristle receiving shaft 13. During the adjusting movement of the bristle receiving shaft 13 synchronously to the introduction of the bristles 12, the band 46, which may be a steel band, is fed by a feeding roller 49 by way of a deflecting roller 48. The feeding roller 48 therefore determines the point of introduction 26 or bristles 12, for example, of the bristle feeding devices 45.

So that the band 46 can be placed tightly against the bristle receiving shaft 13, the feeding roller 49 can be acted upon, for example, by a torsion spring (not shown) against the withdrawal direction of the band 46 by the adjustment of the bristle receiving shaft 13, which torsion spring provides a corresponding retaining force. In addition, the deflecting roller 48 can simultaneously function as a contact pressure roller in order to ensure the optimal positioning of the band 46 over the bristle receiving shaft 13.

The development of the shaft end wall 19 as a band 46 ensures that there will be no relative movement between the shaft end wall 19 and the bristles 12 stacked into the bristle receiving shaft 13 so that these bristles 12 maintain their adjusted position in a stable manner. The construction of the shaft end wall 19 as a band 46 or with a band 46 is particularly advantageous in the case of larger brush-type seal segments.

The band 46 can easily be removed after the stacking-in of the bristles 12 before their further processing to form the brush-type seal 2 in that the fastening 47 is released. If the above-mentioned torsion spring or similar device is present, this spring will then cause the winding of the band 46 onto the feeding roller 49. However, as an alternative, the band 46 may also remain on the bristle receiving shaft 13 as expandable material and form, for example, the back of the brush-type seal 2 to be manufactured. The band 46 is also not limited to steel band or the like. It may also be a coated or uncoated plastic band which, for reasons of stability, is optionally supported by way of a more stable band or a link chain. Also, the band may be shaped such that it contains one or two brush cheeks 30 which are then introduced into the bristle receiving shaft 13 simultaneously with the feeding of the band 46.

For this purpose, by means of the cutting device 8, the bristle material 5 withdrawn from the material dispenser 3 is cut into bristles of a defined length. Beforehand or afterwards, a surface treatment of the bristles 12 can optionally be carried out. The thus obtained bristles 12 are stacked in the bristle receiving shaft 13 which, by means of the control 44, is adjusted such as a function of the filling condition with the bristles 12, that the surface of the bristle stack 28 during the feeding of the bristles 12 always maintained an at least approximately constant position which, in particular, corresponds to the point of introduction 26 on the stationary shaft end wall 19. By means of this control, it is ensured that the fed bristles 12 are always deposited at the point of introduction 26 in a defined manner into the bristle receiving shaft 13 optionally on the surface 27 of an already started bristle stack 28. As result, it is also ensured that the bristles 12 are stacked in a precise position and alignment in which they are finally to be available in the brush-type seal 2.

During the filling operation of the bristle receiving shaft 13, if the operation takes place continuously, the carrier disk 16 is continuously rotated in the same manner or synchronously as a function of the filling level of the bristle receiving shaft 13. In contrast, the shaft end wall 19 as well as the bristle feeding devices 45 remain stationary.

By means of the cutting device 8, the bristles 12 can be cut off the bristle material 5 in a precise manner to a required length. After they were introduced into the bristle receiving shaft 13 by way of the bristle guide 14, the bristles 12 can then be stacked in the shaft 13 in any position which can be defined by the bearing surface 22 of the first segment end 23. In this case, the bristles 12 may, for example, be embedded such that they extend diagonally with respect to the cross-section of the bristle receiving shaft 13 in order to take into account a future use of the brush-type seal on a rotating shaft running in one direction. The cross-sectional shape of the bristle receiving shaft 13 can also be determined as a function of a later use of the brush-type seal 2.

The position, alignment and stacking height of the bristles 12 in the bristle receiving shaft 13 is therefore determined by the segment ends 23, 29 which are also used for fixing the bristles 12 in the bristle receiving shaft 13, after, optionally the shaft end wall 19 was removed. When a defined segment size of a burst-type seal segment 20 to be manufactured is reached, the second segment end 29 is optionally guided to the bristle package or the bristle stack 28. The shaft end wall 19 can now be removed. The bristle backs 41 with the connection area 36 will then be freely accessible.

By means of fastening devices 34, the bristles 12 are then connected among one another and with the brush cheeks 30 which were previously inserted in the bristle receiving shaft 13 or were constructed in it as an alternative which can take place before, during or after the adjustment of the bristles 12. Finally, the brush cheek 30 or cheeks 31, together with the bristles 12 fastened thereto can be removed from the bristle receiving shaft 13. In order to facilitate this, the lateral rings 17, 18 may be completely or partially removable from the carrier disk 16. If only brush-type seal segments 20 were manufactured by means of the process described so far, these must only be combined, that is, fastened to one another, to form a complete brush-type seal.

What is claimed is:

1. Process for manufacturing brush-type seals, the process comprising the acts of:
    stacking bristles in a bristle receiving shaft such that the bristles are partially situated next to a space for at least one brush cheek;
    adjusting the bristle receiving shaft in synchronization with the stacking of the bristles relative to a point of introduction of the bristles into the bristle receiving shaft so that a position of a bristle stack surface in the bristle receiving shaft remains at least essentially constant relative to the point of introduction;
    fastening the bristles on the at least one brush cheek in the bristle receiving shaft; and
    removing the at least one brush cheek with the bristles fastened thereto from the bristle receiving shaft.

2. The manufacturing process for brush-type seals according to claim 1, wherein two brush cheeks are inserted in the bristle receiving shaft, and the bristles are stacked in the bristle receiving shaft such that the bristles are partially disposed between the two brush cheeks.

3. The manufacturing process for brush-type seals according to claim 1, wherein in the bristle area situated next to the at least one brush cheek, the bristles are melted.

4. The manufacturing process for brush-type seals according to claim 2, wherein in the bristle area situated next to the at least one brush cheek, the bristles are melted.

5. The manufacturing process for brush-type seals according to claim 1, wherein before introducing the bristles into the bristle receiving shaft for stacking therein, the bristles are subjected to a surface treatment in their area which comes to be situated next to the at least one brush cheek, which surface treatment promotes the fastening of the bristles to the at least one brush cheek.

6. The manufacturing process for brush-type seals according to claim 2, wherein before introducing the bristles into the bristle receiving shaft for stacking therein, the bristles are subjected to a surface treatment in their area which comes to be situated next to the at least one brush cheek, which surface treatment promotes the fastening of the bristles to the at least one brush cheek.

7. The manufacturing process for brush-type seals according to claim 1, wherein the bristles are fastened in one of their end areas or in an intermediate area to the at least one brush cheek.

8. The manufacturing process for brush-type seals according to claim 1, wherein before introducing the bristles into the bristle receiving shaft, a first segment end part is inserted in the latter, and before the fastening of the bristles on the at least one brush cheek, a second segment end part is inserted into the bristle receiving shaft, wherein the first and second segment end parts are removed before individual brush-type seal segments are combined to form a complete brush-type seal.

9. The manufacturing process for brush-type seals according to claim 2, wherein before introducing the bristles into the bristle receiving shaft, a first segment end part is inserted in the latter, and before the fastening of the bristles on the at least one brush cheek, a second segment end part is inserted into the bristle receiving shaft, wherein the first and second segment end parts are removed before individual brush-type seal segments are combined to form a complete brush-type seal.

10. The manufacturing process according to claim 3, wherein the melting act is performed by using one of a laser, plasma, and burner device.

11. An arrangement for manufacturing brush-type seals, comprising:
    a holding device for constructing a brush-type cheek having bristles fastened thereto for forming the brush-type seal, said holding device comprising:
        a bristle receiving shaft having at least one recess or a brush cheek in its shaft course so that the bristles stacked in the bristle receiving shaft are partly situated next to the brush cheek; and
        wherein said holding device is adjustable relative to a point of introduction of the bristles into the bristle receiving shaft such that a position of a bristle stack surface in the bristle receiving shaft is maintained at least essentially constant in the case of its adjustment relative to the point of introduction.

12. The arrangement for manufacturing brush-type seals according to claim 11, wherein the bristle receiving shaft has a shaft end wall which determines the point of introduction of the bristles and which is held to be stationary during the adjustment of the bristle receiving shaft for determining a shaft inlet.

13. The arrangement for manufacturing brush-type seals according to claim 11, wherein a deflecting roller which determines the point of introduction of the bristles into the bristle receiving shaft is held to be stationary with respect to the bristle receiving shaft for determining a shaft inlet, and wherein a band is provided which is fed synchronously with the adjustment of the bristle receiving shaft by way of the deflecting roller and which is mounted on the bristle receiving shaft in the area of a shaft bottom, wherein the band, in an area of the bristle receiving shaft, being at least a component of a shaft end wall.

14. The arrangement for manufacturing brush-type seals according to claim 11, wherein the bristle receiving shaft contains a removable shaft end wall so that a connection area of the bristles with the at least one brush cheek is exposable in the bristle receiving shaft.

15. The arrangement for manufacturing brush-type seals according to claim 12, wherein the bristle receiving shaft contains a removable shaft end wall so that a connection area of the bristles with the at least one brush cheek is exposable in the bristle receiving shaft.

16. The arrangement for manufacturing brush-type seals according to claim 13, wherein the bristle receiving shaft contains a removable shaft end wall so that a connection area of the bristles with the at least one brush cheek is exposable in the bristle receiving shaft.

17. The arrangement for manufacturing brush-type seals according to claim 11, wherein the bristle receiving shaft contains a ring groove or a ring groove section which can be adjusted about the ring center, and a shaft end wall which covers the ring groove or the ring groove section and which, in particular, is removable and remains stationary during the adjustment of the bristle receiving shaft with respect to the point of introduction of the bristles into the bristle receiving shaft.

18. The arrangement for manufacturing brush-type seals according to claim 12, wherein the bristle receiving shaft contains a ring groove or a ring groove section which can be adjusted about the ring center, and a shaft end wall which covers the ring groove or the ring groove section and which, in particular, is removable and remains stationary during the adjustment of the bristle receiving shaft with respect to the point of introduction of the bristles into the bristle receiving shaft.

19. The arrangement for manufacturing brush-type seals according to claim 13, wherein the bristle receiving shaft contains a ring groove or a ring groove section which can be adjusted about the ring center, and a shaft end wall which covers the ring groove or the ring groove section and which, in particular, is removable and remains stationary during the adjustment of the bristle receiving shaft with respect to the point of introduction of the bristles into the bristle receiving shaft.

20. The arrangement for manufacturing brush-type seals according to claim 14, wherein the bristle receiving shaft contains a ring groove or a ring groove section which can be adjusted about the ring center, and a shaft end wall which covers the ring groove or the ring groove section and which, in particular, is removable and remains stationary during the adjustment of the bristle receiving shaft with respect to the point of introduction of the bristles into the bristle receiving shaft.

21. The arrangement for manufacturing brush-type seals according to claim 11, wherein the bristle receiving shaft has a T-shaped cross-section, in that each of the two transverse branches of the T-shape forms a recess for a brush cheek, and in that the bristles are stackable in the bristle receiving shaft with one of their end areas between the two inserted brush cheeks, the upper section of the T-shape being formed by a shaft end wall which, in particular, is removable and is stationary during the adjustment of the bristle receiving shaft with respect to the point of introduction of the bristles into the bristle receiving shaft.

22. The arrangement for manufacturing brush-type seals according to claim 12, wherein the bristle receiving shaft has a T-shaped cross-section, in that each of the two transverse branches of the T-shape forms a recess for a brush cheek, and in that the bristles are stackable in the bristle receiving shaft with one of their end areas between the two inserted brush cheeks, the upper section of the T-shape being formed by a shaft end wall which, in particular, is removable and is stationary during the adjustment of the bristle receiving shaft with respect to the point of introduction of the bristles into the bristle receiving shaft.

23. The arrangement for manufacturing brush-type seals according to claim 13, wherein the bristle receiving shaft has a T-shaped cross-section, in that each of the two transverse branches of the T-shape forms a recess for a brush cheek, and in that the bristles are stackable in the bristle receiving shaft with one of their end areas between the two inserted brush cheeks, the upper section of the T-shape being formed by a shaft end wall which, in particular, is removable and is stationary during the adjustment of the bristle receiving shaft with respect to the point of introduction of the bristles into the bristle receiving shaft.

24. The arrangement for manufacturing brush-type seals according to claim 14, wherein the bristle receiving shaft has a T-shaped cross-section, in that each of the two transverse branches of the T-shape forms a recess for a brush cheek, and in that the bristles are stackable in the bristle receiving shaft with one of their end areas between the two inserted brush cheeks, the upper section of the T-shape being formed by a shaft end wall which, in particular, is removable and is stationary during the adjustment of the bristle receiving shaft with respect to the point of introduction of the bristles into the bristle receiving shaft.

25. The arrangement for manufacturing brush-type seals according to claim 17, wherein the bristle receiving shaft has a T-shaped cross-section, in that each of the two transverse branches of the T-shape forms a recess for a brush cheek, and in that the bristles are stackable in the bristle receiving shaft with one of their end areas between the two inserted brush cheeks, the upper section of the T-shape being formed by a shaft end wall which, in particular, is removable and is stationary during the adjustment of the bristle receiving shaft with respect to the point of introduction of the bristles into the bristle receiving shaft.

26. The arrangement for manufacturing brush-type seals according to claim 11, wherein the at least one recess for the brush cheek in the bristle receiving shaft is of such a shape and size that, when the brush cheek is inserted therein and bristles are stacked in the bristle receiving shaft, in a connection area of the latter with the at least one brush cheek, a receiving space is formed for fastening devices for fastening the bristles on the at least one brush cheek.

27. The arrangement for manufacturing brush-type seals according to claim 12, wherein the at least one recess for the brush cheek in the bristle receiving shaft is of such a shape and size that, when the brush cheek is inserted therein and bristles are stacked in the bristle receiving shaft, in a connection area of the latter with the at least one brush cheek, a receiving space is formed for fastening devices for fastening the bristles on the at least one brush cheek.

28. The arrangement for manufacturing brush-type seals according to claim 13, wherein the at least one recess for the brush cheek in the bristle receiving shaft is of such a shape and size that, when the brush cheek is inserted therein and bristles are stacked in the bristle receiving shaft, in a connection area of the latter with the at least one brush cheek, a receiving space is formed for fastening devices for fastening the bristles on the at least one brush cheek.

29. The arrangement for manufacturing brush-type seals according to claim 11, wherein the bristle feeding devices are provided for introducing bristles into the bristle receiving shaft.

30. The arrangement for manufacturing brush-type seals according to claim 29, wherein the bristle feeding devices are designed for introducing different types of bristles into the bristle receiving shaft, particularly for definable arrangements of the various bristle types in the bristle receiving shaft, and wherein an adjustable control for the bristle feeding devices is provided for the arrangement of the different bristle types in the bristle receiving shaft.

31. The arrangement for manufacturing brush-type seals according to claim 11, wherein a bottom of the bristle receiving shaft is formed by a layer surface of a first segment end part, and wherein that layer surface determines the position and alignment of the stacked bristles relative to the at least one brush cheek.

32. The arrangement for manufacturing brush-type seals according to claim 11, wherein a control is provided which is designed for synchronizing the adjustment of the bristle receiving shaft with the degree that it is filled with bristles.

33. The arrangement for manufacturing brush-type seals according to claim 32, wherein the control is designed for determining the degree of filling of the bristle receiving shaft with bristles via the bristle feeding into the bristle feeding shaft, and wherein the control is designed particularly for synchronizing the bristle feeing devices with the adjustment of the bristle receiving shaft.

* * * * *